United States Patent [19]

Svoboda et al.

[11] 4,371,187

[45] Feb. 1, 1983

[54] SKI BRAKE

[75] Inventors: Josef Svoboda; Emilie Szabo, both of Schwechat, Austria

[73] Assignee: TMC Corporation, Baar, Switzerland

[21] Appl. No.: 200,121

[22] Filed: Oct. 24, 1980

[30] Foreign Application Priority Data

Oct. 25, 1979 [AT] Austria .................................. 6933/79

[51] Int. Cl.³ .............................................. A63C 7/10
[52] U.S. Cl. ................................................. 280/605
[58] Field of Search ...................... 280/605, 604; 188/5

[56] References Cited

U.S. PATENT DOCUMENTS

| | | | |
|---|---|---|---|
| 4,101,145 | 7/1978 | Korger | 280/605 |
| 4,108,466 | 8/1978 | Weigl | 280/605 |
| 4,171,138 | 10/1979 | Riedel | 280/605 |
| 4,234,206 | 11/1980 | Hofbauer et al. | 280/605 |
| 4,239,256 | 12/1980 | Krob et al. | 280/605 |
| 4,268,060 | 5/1981 | Svoboda | 280/605 |
| 4,278,268 | 7/1981 | Szasz | 280/605 |

FOREIGN PATENT DOCUMENTS 2714175 10/1977 Fed. Rep. of Germany ...... 280/605

Primary Examiner—David M. Mitchell
Attorney, Agent, or Firm—Blanchard, Flynn, Thiel, Boutell & Tanis

[57] ABSTRACT

A ski brake has a base plate secured to the upper side of a ski which pivotally supports a braking arm carrier for movement between a braking position and a retracted position about a first axis normal to the longitudinal axis of the ski. Two wire braking arms are pivotally supported in the braking arm carrier, each braking arm having a free end which is spaced from the braking arm carrier and from the pivot axis of the braking arm. Means are provided for pivoting the braking arms as the braking arm carrier pivots between braking and retracted positions, and springs urge the braking arm carrier toward the braking position. A first member is supported on the base plate for pivotal movement about a second axis, and a second member is pivotally connected at opposite ends to the first member and to the braking arm carrier at the ends thereof remote from the second and first axes, respectively. The second member and braking arm carrier define a toggle-joint.

17 Claims, 15 Drawing Figures

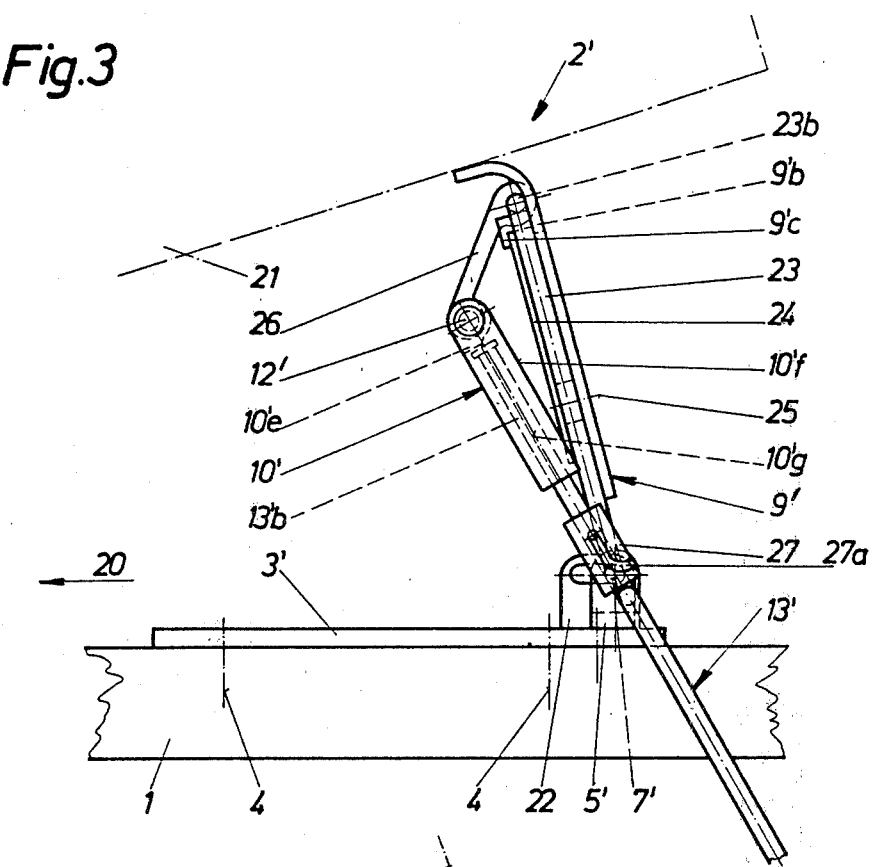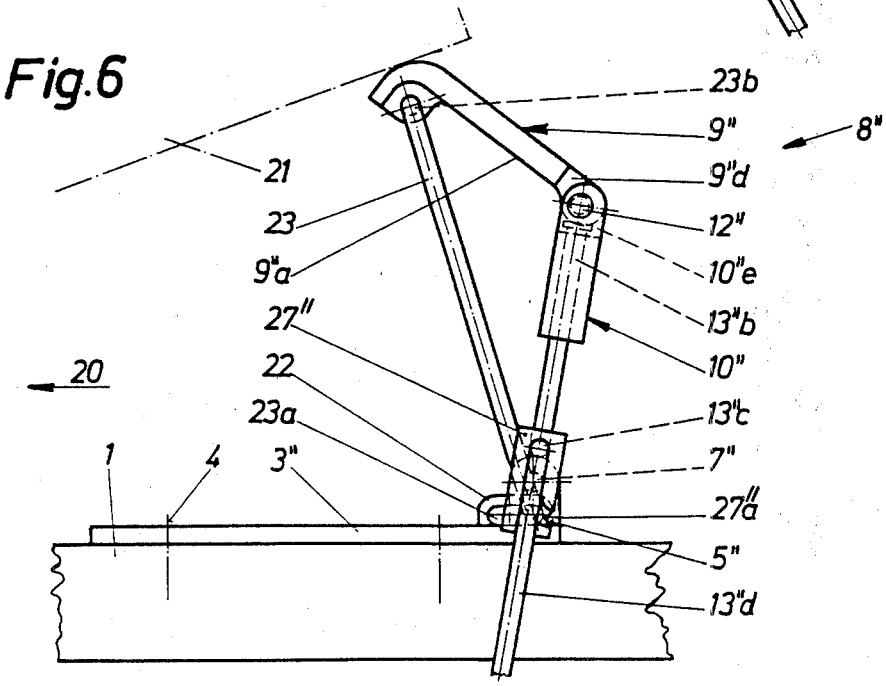

SKI BRAKE

FIELD OF THE INVENTION

This invention relates to a ski brake with two braking arms which each consist of a multiply bent wire material having one wire section which extends parallel to the longitudinal axis of the ski, is supported in a pedal and can be swung in and out relative to the pedal by means of an extension, the pedal being pivotal with the two braking arms against the force of a spring about a ski-fixed axis which extends substantially at a right angle with respect to the longitudinal axis of the ski and, if desired, is formed as a geometric axis or as two semi-axes or bearing pins, the swivel axis itself being supported in a ski-fixed plate.

BACKGROUND OF THE INVENTION

A ski brake of this type is, for example, described in German OS No. 29 00 527. Both in this known ski brake and in other known ski brakes of a similar design there is a common disadvantage, in that the braking arms and thus the braking mandrels which are provided at the free ends of the braking arms always carry out a swivelling movement within a quadrant when they are swung from the retracted position into the braking position and vice versa. This means that the braking arms in both the retracted position and the braking position are either always positioned in the direction of the tip of the ski, or are always directed in the downhill position, namely rear in the direction toward the end of the ski. The first case is disadvantageous because the forwardly directed braking mandrels present a certain danger of getting caught, even if in the downhill skiing position they are pulled in in a conventional manner above the upper side of the ski. In the case of this type of ski brakes which, in the retracted position, have braking arms which point in the direction of the rear end of the ski, the arms are also positioned in the braking position of the ski brake against the direction of travel, so that the braking effect is not as good as in the case of ski brakes with forwardly pointing braking arms.

The purpose of this invention is to bring help here and to design a brake of the abovementioned type in which the braking arms preferably point in the braking position of the ski brake forwardly (in the direction of travel), but in the retracted position point in the direction of the end of the ski (against the direction of travel).

SUMMARY OF THE INVENTION

This purpose is inventively attained by the pedal being constructed in two parts, as is actually known, wherein the two parts of the pedal are connected hingedly to one another, the swivel axle of the support part (braking arm carrier) which carries the two braking arms being guidedly supported in a slide bearing which extends in the direction of the longitudinal axis of the ski and the pedal being supported by means of a bar on a ski-fixed axis which extends substantially at a right angle to the longitudinal axis of the ski, wherein the two parts of the pedal and the bar form, in the side view, a type of toggle-joint system.

The part of the pedal which carries the two braking arms is constructed as a braking arm carrier which, on one side, is hinged to the swivel axle which is in turn supported in the ski-fixed plate in the slide bearing and, on the other side, is connected hingedly to the part which is constructed as a stepping plate. The bar, about which the entire pedal can be pivoted relative to the ski, is hingedly connected to the other end area of the stepping plate. Thus, frictionally viewed, a four-joint system is created which assures that, after the stepping plate is stepped down on, the braking mandrels are positioned against the direction of travel and, when the ski brake is erected through the force of a spring, the braking arms are swung in the direction toward the tip of the ski, wherein at least a substantially vertical position of the braking arms or of their braking mandrels in relationship to the running surface of the ski is achieved.

According to an advantageous embodiment of the invention, the bar is constructed approximately U-shaped in the top view, the two legs of the bar each being constructed as an arm with an eyelet and a flange with an eyelet, the eyelets being constructed at the opposite ends of the arms and the flanges. The eyelets on the one hand facilitate a hinged connection of the bar to the holding plates of the base plate and on the other hand a hinged connection of the stepping plate of the pedal to the bar. This measure permits on the one hand a simple construction of the bar and on the other hand a flat profile of the stepping plate or of the pedal in the retracted position of the ski brake.

A further advantageous embodiment of the invention consists in the area of the braking arm carrier from which projects the braking arm section supported in the braking arm carrier, which area of the braking arm section is remote from the bent end which effects the swinging in and out, being offset, and the associated braking arm section carrying a leg spring, one end of which is secured in the braking arm carrier and the other end of which is secured on the braking arm. Through this, each braking arm is biased to swing outwardly, but permits the bent end, due to a stepping down on the pedal, to effect a swinging in of the individual braking arms.

A further development of the invention consists in each area of the braking arm carrier which carries the axle which is guidedly supported in the slide bearing having a recess which extends in the longitudinal direction of the longitudinal axis of the ski and is constructed symmetrically about such longitudinal axis, in which recess is arranged a support block for one end of a pressure spring, the block being supported on the axle and the other end of the pressure spring being supported on a plate-fixed elbow. The pressure spring serves as an erecting spring for the entire pivotal portion of the ski brake and biases such portion in this manner with its entire force in every position of the pedal or its braking arm carrier.

A different characteristic of the invention is characterized by the braking arm carrier having two grooves which extend parallel to the longitudinal axis of the ski, each receiving in the retracted position of the ski brake a portion of the plate-fixed slide bearing. This measure permits a low design of the ski brake in the retracted position.

A further characteristic of the invention consists in the two eyelets which are provided on the arm-sided free ends of the bar having a bolt extending through them, on which bolt is also hinged the stepping plate, the stepping plate having in each of its two areas which receive the eyelets of the arms of the bar a recess.

A still further characteristic of the invention consists in the stepping plate having on its end area which faces the braking arm carrier a recess for receiving an extension of the braking arm carrier, which areas of the stepping plate and of the braking arm carrier, viewed in the top view, engage one another and have a bolt extending through them at substantially a right angle to the longitudinal axis of the ski. The two areas of the braking arm carrier which follow the extension each have a recess for receiving the bent ends of a braking arm.

A further advantageous embodiment of the invention consists in the braking arm carrier and/or the stepping plate and/or the bar being loaded by the spring which is supported on the support block directly or, through a sloped surface, indirectly in a direction which points upwardly from the upper side of the ski (at an acute solid angle with respect to the upper side of the ski). In this manner it is assured that the ski brake will operate even under unfavorable weather and slope conditions when the ski boot comes free from the ski.

A practical realization of this thought of the invention consists in the spring lying closer to the upper side of the ski at its end area which faces the elbow than at its end area which faces the support block. Thus, the spring has a force component which points upwardly from the upper side of the ski, which component in the downhill skiing position only slightly biases the ski boot.

A different thought of the invention consists in the toggle-joint system being formed by a one-part (one-piece) pedal which is constructed as a stepping plate and is hinged through a connecting piece to the braking arm carrier, wherein the connecting piece and the braking arm carrier lie in every position of the ski brake below the underside of the pedal. This embodiment has the advantage that a three-joint system is practically obtained, the elongated portion of which, formed by the connecting piece and the braking arm carrier and loaded by the stepping plate, lies totally under the action of the component of the stepping-in force which is determined by the stepping-in angle of the ski boot in relationship to the respective angular positions of the pedal during the stepping in. Therefore, in the braking position, the two braking mandrels extend rearwardly, but at a relatively steep angle, so that a good braking effect is maintained. At the same time, this embodiment assures an elastic overload protection, should the braking mandrels get caught on an obstacle on the ground.

A particularly advantageous embodiment of this thought of the invention lies in the spring, as is actually known, being constructed of a spring-steel wire as an approximately U-shaped spring bar, the end areas of which are bent twice, the free ends projecting from the plane of the remaining areas of the bar and the spring being supported in or on the plate by means of the two end areas. The connecting piece is hinged to the bight of the spring bar and, in an imaginary extension of the braking arm carrier, viewed in the direction of the swivel axis of the ski brake, sleeves are pivotally supported on plate-fixed plates, the swivelling direction of which sleeves is the same as the direction of the swivelling movement of the braking arm carrier. Each sleeve has a portion of a first braking arm section of the associated braking arm extending through it, which portion has a pin which slides in a groove of the sleeve, which groove controls the swinging in and out of the associated braking arm and its braking mandrel.

A further thought of the invention lies in each pin of the individual braking arms, which pin is guided in the groove of a sleeve, being formed by a second braking arm section of the braking arm. This embodiment has the advantage that a separate pin does not need to be provided on the braking arm. A disadvantage is that the groove has to be wider than in the embodiment with a separate pin, so that a suitable dimensioning of the sleeve is necessary.

A different thought of the invention lies in securing to the plate on each side of the slide bearing a guide piece, wherein the second braking arm section of the associated braking arm rests in each of its positions on a guide surface on the associated guide piece. The control which effects the swinging in of the individual braking arms can, through this measure, be applied in an area of the ski brake which is independent of the operating pedal.

In a further development of this thought, the guide piece is either designed to extend with approximately half of its length parallel to the longitudinal axis of the ski and with a subsequent curvature which points in the direction of the longitudinal axis of the ski, or is designed to curve continuously toward the longitudinal axis of the ski. The specific development of the guide piece is to be chosen in each case in dependence on the dimensions which are to be used, such as the length of the second braking arm sections and their capability for swivelling.

A different thought of the invention for swinging in and out the individual braking arms consists in a bent end area of each braking arm extending substantially at a right angle in a direction toward the longitudinal axis of the ski and having a nose engage it or a fork grip around it, which nose or fork is secured to the associated end area of the stepping plate or is constructed out of the same. This embodiment is to be used on the type of ski brakes in which the pedal is divided into a braking arm carrier and a stepping plate, the braking arm carrier and the stepping plate being pivotal relative to one another so that extending of the toggle-lever system falls into this area. By extending the toggle-lever system, the stepping plate and thus the nose or fork swivels toward the braking arm carrier, wherein simultaneously the bent end of the associated braking arm and in turn the associated braking mandrel are swung in. If a nose is provided, then a separate spring must be used to effect swinging out, as was mentioned earlier. If the extension of the stepping plate is formed by a fork which grips around the bent end of the associated braking arm from below and from above, both the swinging in and also the swinging out of the braking arms is controlled automatically, so that use of a separate return spring is not necessary.

BRIEF DESCRIPTION OF THE DRAWINGS

Further details, advantages and characteristics of the invention will be described in yet greater detail in connection with the several following embodiments of an inventive ski brake.

In the drawings:

FIGS. 3 to 5 illustrate a second embodiment of a ski brake, wherein FIG. 3 is a side view in the braking position, FIG. 4 is a side view in the retracted position, and FIG. 5 is a top view associated with FIG. 4;

FIGS. 6 to 8 illustrate a third embodiment of a ski brake in views respectively similar to the views of FIGS. 3 to 5;

FIG. 9b is a sectional view showing details of an alternative embodiment of the structure of FIG. 9a;

FIG. 10b is a sectional view of an alternative embodiment of the structure of FIG. 10a.

Figure 1:
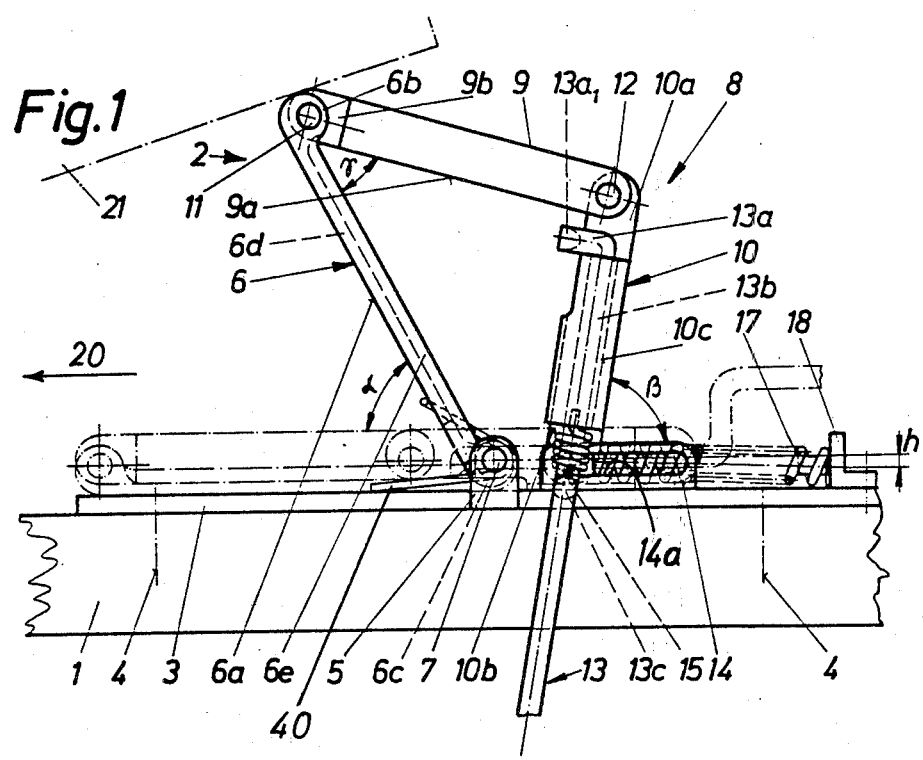
FIG. 1 is a side view of a first embodiment of a ski brake in a braking position.
Figure 2:
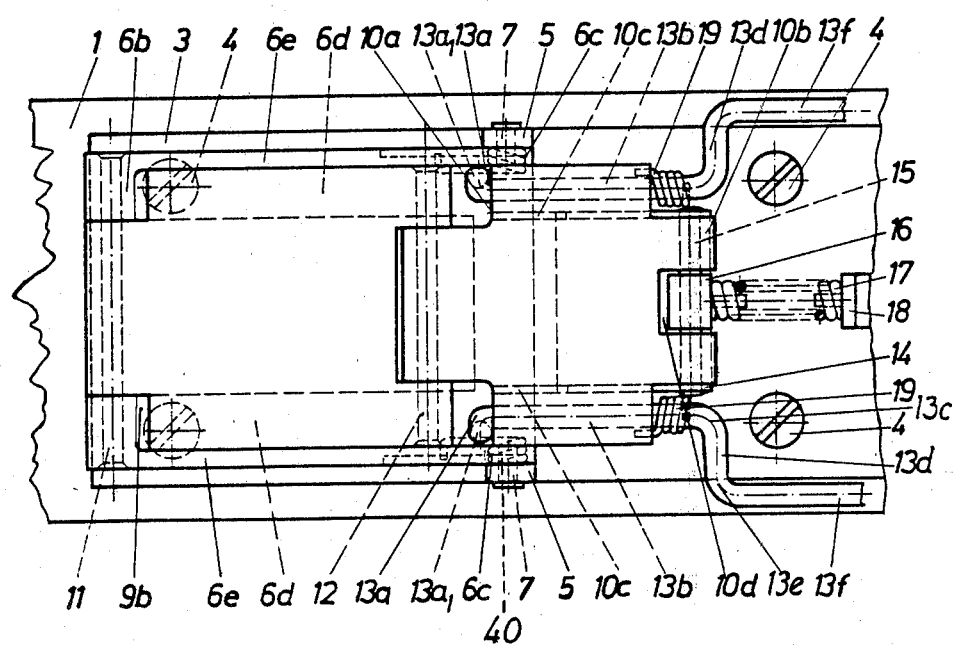
FIG. 2 is a top view of the ski brake of FIG. 1 in a retracted position showing the braking mandrels swung into their position above the upper side of the ski.

In the first embodiment, according to FIGS. 1 and 2, a ski brake which is identified as a whole with reference numeral 2 has a base plate 3 which is secured on the ski 1 by means of screws 4 which are shown schematically. The plate 3 carries approximately in the area of its center, and laterally ends with, two plate-fixed holding plates 5. The plates 5 are disposed on opposite sides of a U-shaped bar 6 which is flattened on its underside 6a, which underside faces the plate 3. The two legs of the bar 6 are constructed as arms 6d. The bar 6 is provided at its four corners with eyelets 6b, 6c which will be described in greater detail later and which have openings which extend normally with respect to the longitudinal axis of the ski 1. The eyelets 6b, which are provided at the ends of the arms 6d of the bar 6, have the same width as the associated arms 6d. The arms 6d carry flanges 6e which extend parallel to the longitudinal axis of the ski and end flush with the outer edges of the arms 6d. The height of the flanges 6e corresponds approximately to the radius of the eyelets 6b and is larger than the height of the arms 6d of the U-shaped bar 6. The flanges 6e pass over into eyelets 6c at their ends which do not face the eyelets 6b, which eyelets 6c have the same width as the flanges 6e. The plates 5 grip laterally around the eyelets 6c of the bar 6 and are pivotally connected to same by means of pins 7 which extend normally with respect to the longitudinal axis of the ski 1. In the area of each pin 7, there is provided a leg spring 40, one end of which is supported on the plate 3 and the other end of which biases one of the arms 6d of the bar 6. The springs 40 thus encourage the pivoting of the ski brake into the braking position.

The ski brake 2 further has a pedal 8 which is designed in two parts and consists of a stepping plate 9 and a braking arm carrier 10.

The stepping plate 9 is slightly narrower than the distance between the flanges 6e of the bar 6, since its underside 9a rests in the retracted position of the ski brake 2 between the flanges 6e and on the arms 6d of the bar 6. (See the position illustrated in dash-dotted lines in FIG. 1).

The eyelets 6b of the bar 6 are disposed in recesses 9b of the stepping plate 9 and are hingedly connected to same by a bolt 11 which extends normally with respect to the longitudinal axis of the ski 1.

The braking arm carrier 10 has the same width as the stepping plate 9 and is connected hingedly thereto by means of a bolt 12 which extends normal to the longitudinal axis of the ski 1. The braking arm carrier 10 has recesses 10a at its end which faces the stepping plate 9, into each which recess projects a bent end 13a of a braking arm 13. Each bent section 13a extends substantially at a right angle with respect to a braking arm section 13b which is pivotally supported in the braking arm carrier 10 and extends parallel to the longitudinal axis of the ski 1. The bent section 13a has in its end area an inclined portion 13a₁.

During the swinging of the ski brake 2 into the retracted position illustrated in FIG. 2, the sloped end areas 13a of the braking arms 13 engage the arms 6d of the bar 6 and effect the pivoting of the entire braking arms 13 so that the mandrels 13f move in a direction toward the longitudinal axis of the ski 1. The angle of the sloped portion 13a, determines the degree of the swinging in of the braking arms 13 or their only indicated braking mandrels 13f.

After the braking mandrel section 13b exits from the braking mandrel carrier 10, each braking mandrel 13 is bent twice. The first bend 13c is spaced from the braking mandrel carrier 10, which space is needed to mount a leg spring 19 thereon, and is directed at substantially a right angle to the longitudinal axis of the ski 1. A second braking arm section 13d follows the first bend 13c, which braking arm section 13d has thereafter a second bend 13e which is spaced from the braking arm section 13b held pivotally in the braking arm carrier 10 and which forms substantially a right angle with the second section 13d. The second bend 13e is followed by a third section which serves as a braking mandrel 13f and extends substantially parallel to the longitudinal axis of the ski 1. The not-illustrated free end area of the braking mandrel 13f carries in a conventional manner a braking blade or the like. Two braking arms 13 are provided which, in relationship to the longitudinal axis of the ski 1, are arranged as mirror images in the braking arm carrier 10.

The end area 10b of the braking arm carrier 10, which end area faces the plate 3 in the braking position of the ski brake 2, slides by means of an axle 15 disposed in an elongated slot or slide bearing 14 in base plate-fixed plates. In order to be able to receive the plates of this slide bearing 14 in the retracted position of the ski brake 2, the underside of the braking arm carrier 10 is provided with two grooves 10c which extend parallel with the longitudinal axis of the ski 1, the width of and distance between which are adjusted to the plates of slide bearing 14. The end area 10b carries a recess 10d which serves to position a support block 16 for a pressure spring 17. The support block 16 is coupled to the braking arm carrier 10 by means of the axle 15. The other end of the pressure spring 17 is supported on a base plate-fixed elbow 18.

Figure 11:
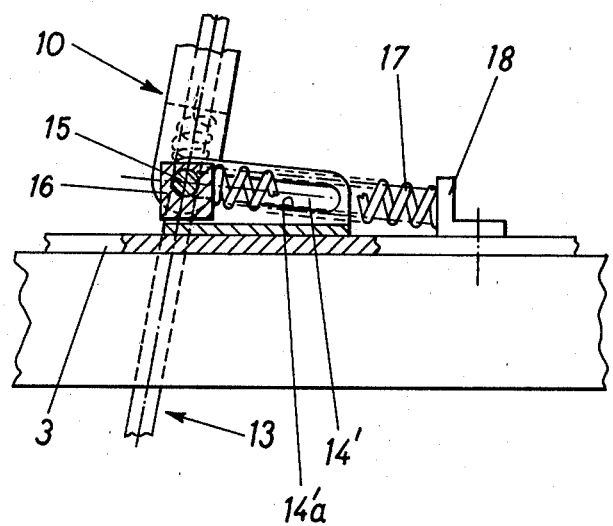
FIG. 11 is a fragmentary side view of a further embodiment which is a slightly modified form of the embodiment of FIG. 1.

As shown in FIG. 1, the elongated slot 14 and the lower edge surface 14a thereof extend substantially horizontally. The embodiment of FIG. 11 is identical to that of FIG. 1, except that the slot 14' and the lower edge surface 14a' thereof are sloped upwardly. The sloped edge surface 14a', in association with the urging of the spring 17, urges the lower end of the braking arm carrier 10 upwardly at an acute angle with respect to the upper side of the ski.

In the braking position of the ski brake 2, illustrated in FIG. 1, the braking mandrels 13f of the braking arms 13 of the ski brake 2 are directed slightly in the direction of the arrow 20, which arrow indicates the skiing direction, to achieve a better braking action than in the case of slightly rearwardly directed braking mandrels. The pressure spring 17 and the leg spring 19 are at least partly unloaded or relaxed in this position of the ski brake 2.

If now a ski boot 21, indicated in FIG. 1 in dash-dotted lines, acts on the stepping plate 9, the entire ski brake 2 assumes the position illustrated in dash-dotted lines in FIG. 1, wherein the braking mandrels 13f of the braking arms 13 are directed opposite the skiing direction (arrow 20). This swinging of the braking mandrels 13f rearwardly is achieved by the multi-hinged connection of the bar 6, of the stepping plate 9 and of the braking arm carrier 10 with the plate 3 and by the simultaneous sliding of the entire pedal 8 by means of the axle 15 in the slide bearing 14 in the longitudinal direction of the ski 1 rearwardly and against the force of the pressure spring 17. By suitably selecting the lengths of the bar 6, of the stepping plate 9, of the braking arm carrier 10 and of the angles α, β and γ (FIG. 1), it is possible to control the movement of the not-shown end area of the braking mandrels 13f. The leg spring 19 and the pressure spring 17 are initially tensioned in the retracted position of the ski brake 2.

Figure 4:
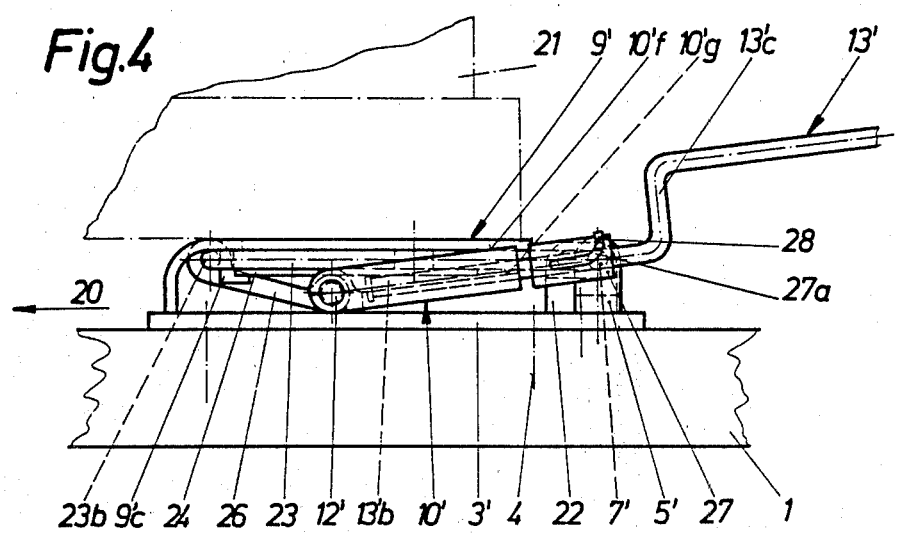
Figure 5:
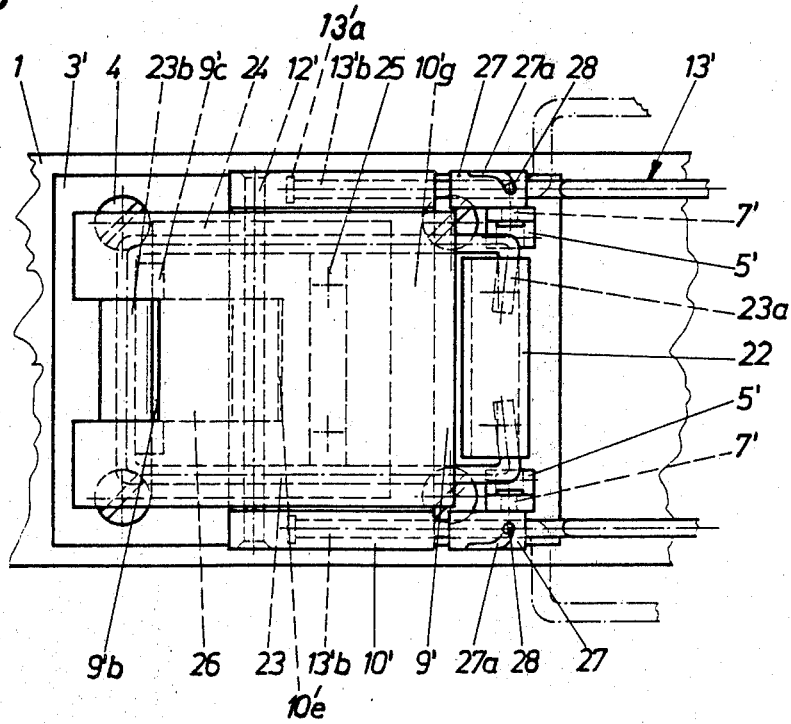

The second exemplary embodiment of a ski brake 2' is illustrated in FIGS. 3 to 5.

The ski brake 2' is secured by means of a base plate 3' and screws 4 (FIG. 5) on a ski 1. An arrow 20 points toward the not-illustrated ski tip. The plate 3' carries, not facing the tip of the ski, a base plate-fixed bearing 22 for an erecting spring 23. The erecting spring 23 is held in a pedal, which is designed in one piece and is referred to as stepping plate 9' hereinafter, by means of two noses 9'c on the stepping plate 9' which are each positioned laterally of a recess 9'b and by means of a plate 24 with rivets 25 (shown schematically). The erecting spring 23 is manufactured in a conventional manner as a U-shaped bar of spring wire, the free end areas of which are bent twice so that the ends 23a adjacent the second bends project from the plane of the remaining area of the bar 23. The bight 23b which does not face the bent ends 23a of the erecting spring 23 and which extends at substantially a right angle to the longitudinal axis of the ski 1 serves as a pivot axis for a connecting piece 26. The other end of the connecting piece 26 extends into a recess 10'e of the braking arm carrier 10' and is hingedly connected to same by means of a bolt 12' which extends normally with respect to the longitudinal axis of the ski 1. The stepping plate 9', the braking arm carrier 10', and the connecting piece 26 together form a type of toggle-joint system.

The braking arm carrier 10' has on its upper side 10'f, which side does not face the plate 3' in the retracted position of the ski brake 2, a groove-like recess 10'g which extends parallel to the longitudinal axis of the ski 1 through the braking arm carrier 10' over its entire length. The width of the recess 10'g is slightly larger than the width of the stepping plate 9', in order to be able to partly receive same therein in the retracted position of the ski brake 2'.

The braking arm section 13'b of a braking arm 13' is secured by a head 13'a (FIG. 5) against movement in the longitudinal direction in the braking arm carrier 10' but is supported for pivotal movement and is, as already described for the first exemplary embodiment, bent twice. The swinging in and out of the mandrels of each braking arm 13' is effected by means of a sleeve 27, in which the first braking arm section 13'b of the associated braking arm 13' is rotatably supported. Each sleeve 27 is supported on a plate-fixed base plate 5' by means of a sleeve-fixed pin 7' which extends normally with respect to the longitudinal axis of the ski 1 for pivotal movement in the direction of the swivelling movement of the braking arm carrier 10'. The individual braking arm sections 13'b each have a radially extending pin 28 which slides in a groove 27a provided in the sleeve 27. The groove 27 first extends parallel to the longitudinal axis of the first braking arm section 13b and then extends along a guide curve toward the longitudinal axis of the ski 1. Through this, during the swinging of the braking mandrel carrier 10', there simultaneously occurs a controlled longitudinal and pivotal movement of the associated braking arm 13' and a swinging in or out of its braking mandrel 13'f. Two braking arms 13, each having a sleeve 27, are provided and are arranged symmetrically with respect to the longitudinal axis of the ski 1.

In the braking position of the ski brake 2', illustrated in FIG. 3, the braking arms 13' or rather braking mandrels 13'f are directed rearwardly at an acute angle against the direction of the arrow 20 (opposite the skiing direction). The erecting spring 23 is relaxed. If now a sole of a ski boot 21, which sole is indicated by dash-dotted lines, acts onto the stepping plate 9', then the ski brake 2' swings against the force of the erecting spring 23 into the retracted position which is illustrated in FIGS. 4 and 5. The toggle-joint system which is formed by the braking arm carrier 10' which carries the two braking arms 13' and by the connecting piece 26 is thereby extended, wherein each braking arm 13' is moved longitudinally in a sleeve 27, which sleeve pivots about the pin 7', in the direction of the longitudinal axis of the ski 1 opposite the direction of the arrow 20 (rearwardly). By this longitudinal movement of the two braking arms 13' in the sleeves 27, the braking-mandrel-fixed pin 28 is forcedly controlled by the groove 27a, which causes the swinging in of the two braking mandrels 13'f.

In this second embodiment of the ski brake 2', all effects which have already been described with respect to the first embodiment are achieved, except that the two braking mandrels 13'f are directed slightly rearwardly in the braking position of the ski brake 2'. It is possible, however, with reference to the running surface of the ski 1, to achieve a steep angle, so that a good braking effect is achieved. This embodiment automatically assures at the same time a protection against an overload.

Figure 7:
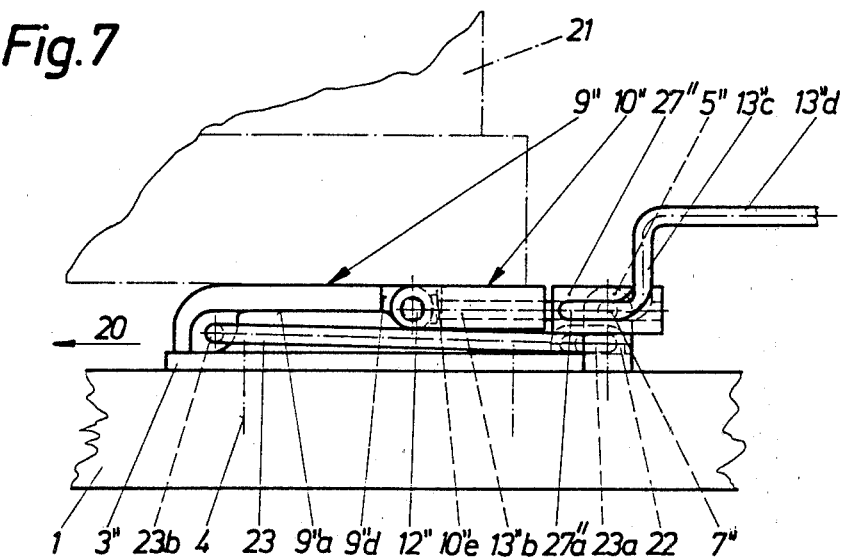
Figure 8:
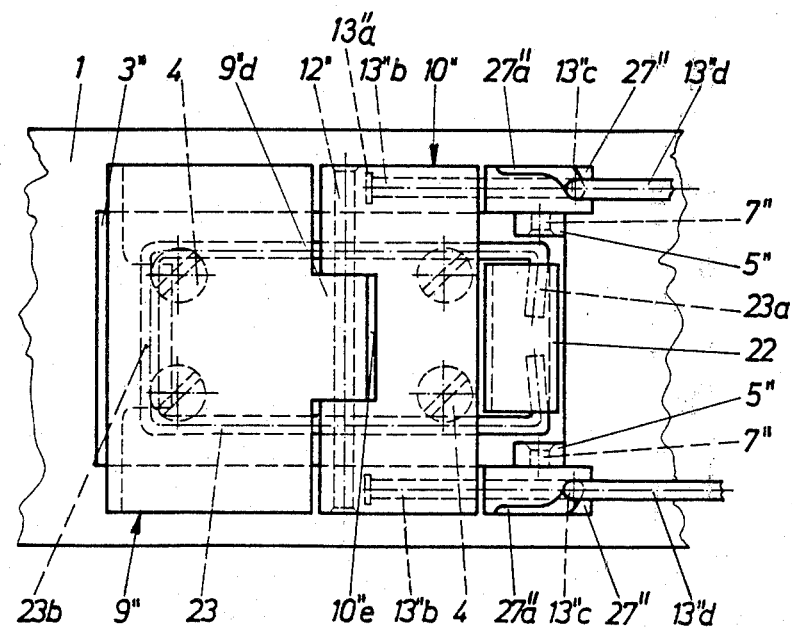

A further exemplary embodiment of a ski brake 2" can be seen in FIGS. 6 to 8. A base plate 3" is secured by means of screws 4 (FIG. 8) on a ski 1. Same carries in its area which does not face the tip of the ski (against the direction of the arrow 20) a plate-fixed bearing 22 for an erecting spring 23, which bearing is similar to that already been described in the second embodiment.

A pedal 8" is designed in two parts, similar to the first exemplary embodiment, and consists of a stepping plate 9" and a braking arm carrier 10". The erecting spring 23 corresponds in its structure with the spring of the second exemplary embodiment.

The stepping plate 9" is hingedly connected, in the area which in the retracted position faces the tip of the ski lying in the direction of the arrow 20, to the bight 23b of the erecting spring 23, which bight 23b does not face the bent ends 23a. An area of the stepping plate 9", which area does not face the tip of the ski, is slightly stepped, is constructed as a tab 9"d and is disposed in a recess 10"e of the braking arm carrier 10" to which it is connected hingedly by means of a bolt 12". The stepping plate 9" is hollowed out on its underside 9"a in order to be able to receive the erecting spring 23 therein in the retracted position.

The width and thickness of the braking arm carrier 10" is constant throughout its entire length. Two braking arm sections 13"b, which are secured by heads 13"a (FIG. 8) against a movement in the direction of the longitudinal axis of the ski 1 but are pivotally supported, are each guided in their extension partly is a sleeve 27" and transfer through first bent sections 13"c into second braking arm sections 13"d which perform the function of the two pins 28 described in the second embodiment. Due to the larger diameter of the braking arm, as compared with the pin 28 (compare FIGS. 3 to 5 with FIGS. 6 to 8), the width of the groove 27"a is larger. The first bent sections 13"c are spaced from the braking arm carrier 10" a distance which is determined by the movement of the braking mandrels 13" in the direction of the longitudinal axis of the ski 1 and by the length of the sleeve 27". The further development of the individual braking arms 13" corresponds with the already described braking arms.

The sleeves 27" are, as already described, supported together with the braking arm carrier 10" by means of pins 7" on the plate-fixed plates 5".

As can be seen from FIG. 6, the braking mandrels 13"f of the braking arms 13" are directed slightly forwardly (arrow 20) in the braking position of the ski brake 2.

Upon a swivelling of the ski brake 2" by means of the sole of a ski boot 21, indicated in FIGS. 6 and 7 by dash-dotted lines, to the retracted position illustrated in FIGS. 7 and 8, the erecting spring 23 is initially tensioned. The first bent sections 13"d of the braking arm 13" slide in the grooves 27"a of the sleeves 27", which sleeves simultaneously pivot about the pins 7". The braking mandrels 13"f of the braking arms 13" are directed rearwardly in the retracted position of the ski brake 2 (against the direction of the arrow 20).

Figure 9:
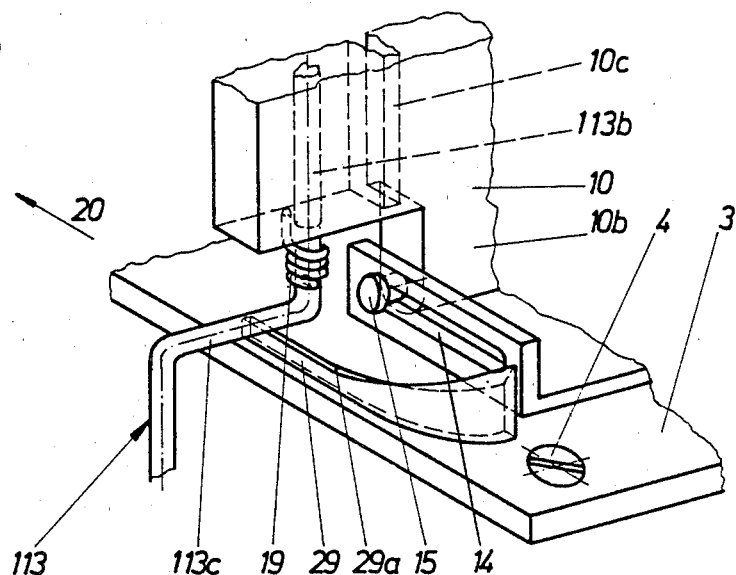
FIGS. 9 and 10 are perspective views of two embodiments showing structure which effects the swinging in of the braking mandrels of the ski brake.
Figure 10:
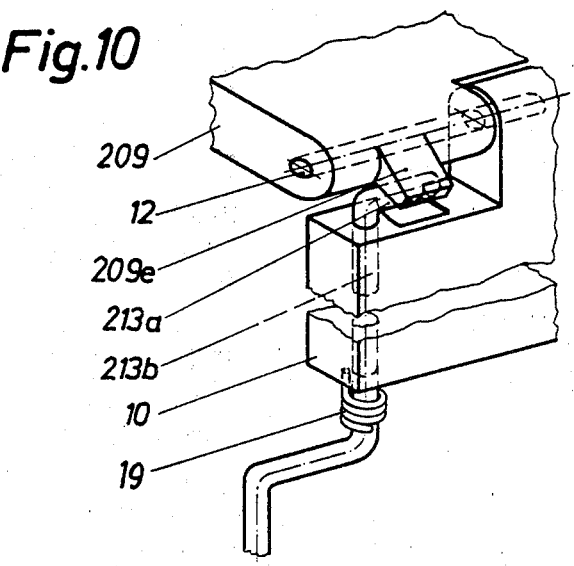

Two further modifications of the braking mandrels 13 of the ski brake 2 illustrated in FIGS. 1 and 2, which braking mandrels can be swung in, can be respectively recognized in FIGS. 9 and 10. As can be seen from FIG. 9, and as already described for the first embodiment of the ski brake 2, the braking arm carrier 10 slides, during the swinging of the ski brake 2 from the braking position into the retracted position, in a base plate-fixed slide bearing 14 by means of the axle 15 which extends through the end area 10b. Each of the braking arms 113 which are pivotally supported in the braking arm carrier 10 slides, during this swinging operation, on a guide surface 29a of a base plate-fixed guide piece 29 according to FIG. 9.

Starting from the end of the guide piece 29, which guide piece is below the second braking arm section 113d of the braking arm 113, the guide piece 29 extends parallel to the longitudinal axis of the ski 1 and parallel to the two edges of the slide bearing 14 of the plate 3, which edges also extend in such direction, at a constant height toward the not-illustrated end of the ski. Starting approximately in the area halfway along its length, the guide piece 29 curves toward the center of the plate 3 and has at the smae time a continuously rising shape. Each guide piece 29 is designed slightly longer than the slide bearing 14 and is arranged on the plate 3 so that it projects over the plate between its two ends approximately at a height which assures that the second braking arm section 113c of the associated individual braking arm 113 rests in each of its conceivalbe positions on the upper side of the guide piece 29.

Figure 9A:
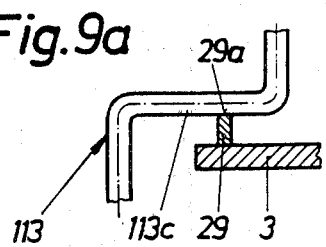
FIG. 9a is a sectional view showing details of the bent section of the braking mandrel of FIG. 9 and the associated sliding surface.
Figure 9B:
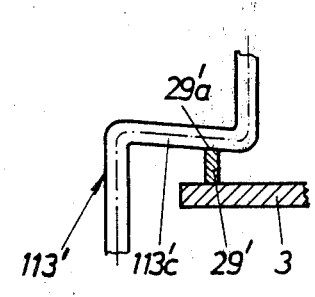

It is advantageous to construct the guide surface 29a of each guide piece 29 so that it drops off continuously toward the center of the plate 3 and, at its end which does not face the not shown tip of the ski, is positioned substantially normal to the upper side of the plate 3. As can further be seen from FIG. 9a, the guide surface 29a extends in the associated area of the guide piece 29 parallel to the upper side of the plate 3. It would also be conceivable to alternatively use the spiral-shaped guide surfaces 29"a and the shape of the second braking arm sections 113c of the individual braking arms 113, which are shown in FIG. 9b.

Figure 10A:
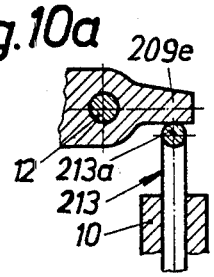
FIG. 10a is a sectional view showing details of a nose which is a component of the structure of FIG. 10.
Figure 10B:
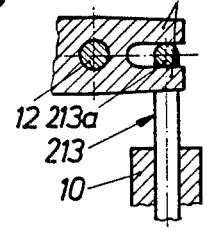

FIGS. 10, 10a and 10b illustrate a further control for swivelling the individual braking arms 213. The stepping plate 209 has for this purpose an extension, which is designed either as a nose 209e (see FIGS. 10 and 10a) or as a fork 209'e (see FIG. 10b). The nose 209e lies, in the braking position of the ski brake 2, on the bent end 213a of the braking arm 213 which, in this case, extends toward the longitudinal axis of the ski 1. During swivelling of the ski brake 2 into the retracted position, the toggle-joint system of the stepping plate 209 and of the braking arm carrier 10 is extended, wherein, the nose 209e presses on the bent end 213a and effects the swinging in of the braking arm 213 against the force of the leg spring 19. The swinging out is done by the leg spring 19 after release of the bent end 213a of the braking arm 213 by the nose 209e of the stepping plate 209.

The fork 209'e illustrated in FIG. 10b has the advantage that it effects both swinging in and out of the braking arm 213, and thus the use of a return spring is not needed.

The invention is not limited to the illustrated exemplary embodiments. Various modifications can be carried out without leaving the scope of protection of the invention. For example, in the first exemplary embodiment, it is possible to arrange several springs side-by-side which are supported directly on associated support blocks or, by means of an intermediate piece, on one single support block. It is also conceivable, in the retracted position of the ski brake, to hold each braking mandrel under a cover.

Furthermore, it is important for the invention that movement of the individual braking arms in the direction of their longitudinal axes can take place in all exemplary embodiments in which braking arm sections which extend parallel to the longitudinal axis of the pedal are held guided in a sleeve.

The embodiments of the invention in which an exclusive property or privilege is claimed are defined as follows:

1. In a ski brake mountable on a ski, having a pedal supported on a base for pivotal movement between a braking position and a retracted position, and having two braking arms which each have one section which in the retracted position extends parallel to the longitudinal axis of the ski and is movably supported in said pedal and a second section which is parallel to and offset from said one section and can be swung in and out relative to the longitudinal axis of the ski, said pedal being pivotal against the force of a spring about a swivel axle which extends at substantially a right angle to the longitudinal axis of the ski and is supported on said base, the improvement comprising wherein said pedal includes frist and second parts which are pivotally coupled to one another, said braking arms being movably supported on said first pedal part, said swivel axle pivotally supporting said first pedal part at a location thereon spaced from said pivotal connection to said second pedal part, wherein said swivel axle is guidedly supported in a slide bearing for movement longitudinally of the ski, wherein said second pedal part is movably coupled at a location thereon spaced from said pivotal connection to said first pedal part to one end of an elongate bar, the other end of said bar being supported on said base for pivotal movement about a fixed axis which extends substantially at a right angle with respect to the longitudinal axis of the ski, and wherein said first and second parts of said pedal and said bar form a toggle-joint system.

2. The ski brake according to claim 1, wherein said bar is approximately U-shaped, the two legs of said U-shaped bar each having a longitudinally extending flange thereon and an eyelet at each end thereof; including means cooperable with said eyelets at said other end of said bar for facilitating said pivotal support of said bar on said base; and including means on said second part of said pedal cooperable with said eyelets at said one end of said bar for facilitating said movable support of said bar on said second pedal part.

3. The ski brake according to claim 1, wherein said braking arms each have a bent end, wherein means cooperable with said bent ends is provided on said second pedal part for moving said braking arms relative to said first pedal part to effect said swinging in and out of said second sections, wherein said first pedal part, at a location which is remote from said bent ends of said braking arms which effect the swinging in and out is stepped, and wherein each braking arm carries a torsion spring, one end of which is secured to said first pedal part and the other end of which is secured to said associated braking arm.

4. The ski brake according to claim 1, wherein said spring is a compression spring, and wherein the region of said first pedal part which cooperates with said first swivel axle which is guidedly supported in said slide bearing has a recess which extends in the direction of the lognitudinal axis of the ski, which is symmetric with respect to said longitudinal ski axis, and through which said swivel axle extends, in which recess is arranged a support block which is supported on said swivel axle and supports one end of said spring, the other end of said spring being supported on said base.

5. The ski brake according to one of the claims 1, 3 or 4, wherein said first pedal part has two grooves which extend parallel to the longitudinal axis of the ski, each said groove receiving in the retracted position of said pedal a portion of said slide bearing.

6. The ski brake according to claim 2, wherein said eyelets provided at one end of each of said legs of said bar have extending therethrough a bolt which is provided on said second pedal part, and wherein said second pedal part has recesses with receive therein said eyelets at said one end of said legs of said bar.

7. The ski brake according to claim 3, wherein said first pedal part has an extension thereon adjacent said second pedal part, said second pedal part has, at a location thereon adjacent said first pedal part, a recess for receiving said extension therein, wherein said second pedal part includes a bolt which extends through said recess and extension substantially at a right angle with respect to the longitudinal axis of the ski, thereby effecting said pivotal connection of said first and second pedal parts, and wherein said first pedal part has, adjacent said extension recesses which each receive a respective said bent end of a respective said braking arm.

8. The ski brake according to claim 4, wherein said pedal is biased by said spring supported on said support block in a direction which entends upwardly from the upper side of the ski at an acute angle with respect to the upper side of the ski.

9. The ski brake according to claim 8, wherein said other end of said spring lies closer to the upper side of the ski than said one end of said spring.

10. The ski brake according to claim 4, wherein said pedal is indirectly biased, by said spring supported on said support block and by a sloped surface, in a direction which extends upwardly from the upper side of the ski at an acute angle thereto.

11. The ski brake according to claim 1, wherein said slide bearing includes at least one plate supported on said base and having an elongate slot therein, said swivel axle being slidably received in said slot.

12. The ski brake according to claim 11, wherein said slot is substantially horizonatal.

13. The ski brake according to claim 11, wherein said slot is inclined to the horizontal.

14. The ski brake according to claim 1, including a further spring cooperable with said bar which urges said bar pivotally about said fixed axis.

15. The ski brake according to claim 3, wherein said means for moving said braking arms includes at least one nose provided on said second pedal part and cooperable with a respective said bent end of a said braking bar in response to relative pivotal movement of said first and second pedal parts.

16. The ski brake according to claim 1, wherein said braking arms each have a bent end, and including fork-like means provided on said second pedal part and cooperable with a respective said bent end of a said braking arm for effecting said swinging in and out of said second section thereof in response to relative pivotal movement of said first and second pedal parts.

17. The ski brake according to claim 1, wherein each said braking arm has a third section connecting and extending substantially normal to said first and second sections, and including guide surface means on said base and cooperable with said third sections for effecting said swinging in and out of said second sections in respones to movement of said first and pedal part relative to said base.

* * * * *

UNITED STATES PATENT AND TRADEMARK OFFICE
CERTIFICATE OF CORRECTION

PATENT NO. : 4 371 187
DATED : February 1, 1983
INVENTOR(S) : Josef Svoboda and Emilie Szabo It is certified that error appears in the above-identified patent and that said Letters Patent is hereby corrected as shown below:

Col. 10, line 66; change "frist" to ---first---.
Col. 11, line 42; change "lognitudinal" to ---longitudinal---.
Col. 11, line 57; change "with" to ---which---.
Col. 12, line 15; change "entends" to ---extends---.
Col. 12, lines 55 and 56; change "respones" to ---response---.
Col. 12, line 56; delete "and".

Signed and Sealed this

Seventeenth Day of May 1983

[SEAL]

Attest:

DONALD J. QUIGG

Attesting Officer

Acting Commissioner of Patents and Trademarks